Figure 4:
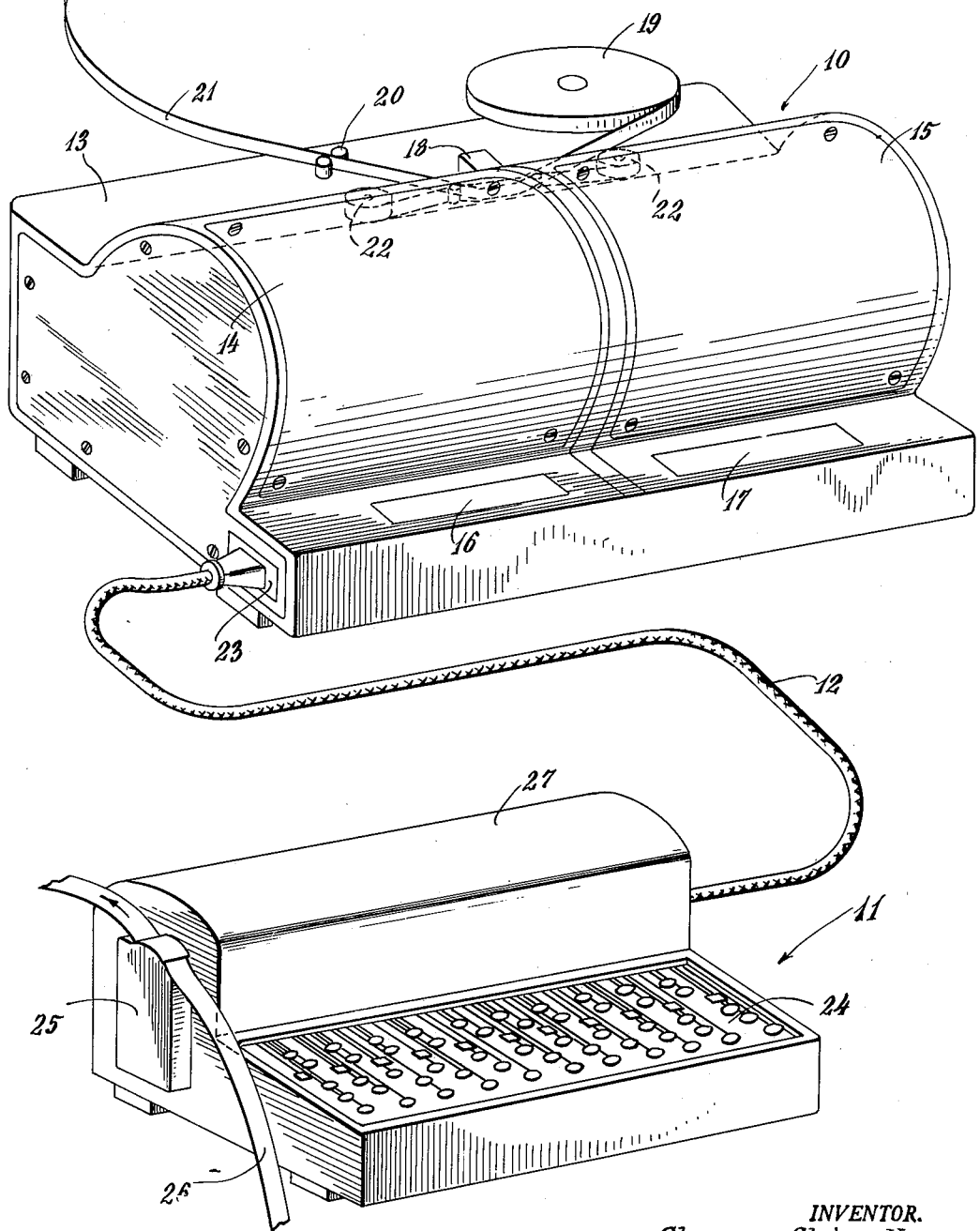

Dec. 27, 1955     CHUNG-CHIN KAO     2,728,816

JAPANESE LANGUAGE TELEGRAPH PRINTER

Filed March 24, 1953     12 Sheets-Sheet 1

*Fig. 1.*

KANAS

| PRIMARY | | | | | SECONDARY | | | | | |
|---|---|---|---|---|---|---|---|---|---|---|
| あ | い | う | え | お | | | | | | |
| か | き | く | け | こ | が | ぎ | ぐ | げ | ご | NIGORIS |
| さ | し | す | せ | そ | ざ | じ | ず | ぜ | ぞ | |
| た | ち | つ | て | と | だ | ぢ | づ | で | ど | |
| な | に | ぬ | ね | の | | | | | | |
| は | ひ | ふ | へ | ほ | ば | び | ぶ | べ | ぼ | |
| ま | み | む | め | も | ぱ | ぴ | ぷ | ぺ | ぽ | HAN-NIGORIS |
| や | い | ゆ | え | よ | | | | | | |
| ら | り | る | れ | ろ | | | | | | |
| わ | ゐ | う | ゑ | を | | | | | | |
| ん | | | | | | | | | | |

*Fig. 2.*

| 言 0337 | 黑 0649 | 活 0536 | 春 0820 | 多 0224 |
| 語 0639 | 白 0214 | 動 0918 | 夏 0730 | 少 0231 |
| 主 0248 | 青 0302 | 假 0941 | 秋 0611 | 風 0732 |
| 客 0410 | 黃 0828 | 名 0316 | 冬 0412 | 雨 0710 |

*Fig. 3.*

私ハ日本語デ話サレル ← J J J J J J

INVENTOR.
Chung-Chin Kao
BY Walter S. Hustan

ATTORNEY.

Dec. 27, 1955 CHUNG-CHIN KAO 2,728,816
JAPANESE LANGUAGE TELEGRAPH PRINTER
Filed March 24, 1953 12 Sheets-Sheet 2

INVENTOR.
Chung-Chin Kao
BY Walter S. Alexton
ATTORNEY.

Dec. 27, 1955 — CHUNG-CHIN KAO — 2,728,816

JAPANESE LANGUAGE TELEGRAPH PRINTER

Filed March 24, 1953 — 12 Sheets-Sheet 3

Fig. 5.

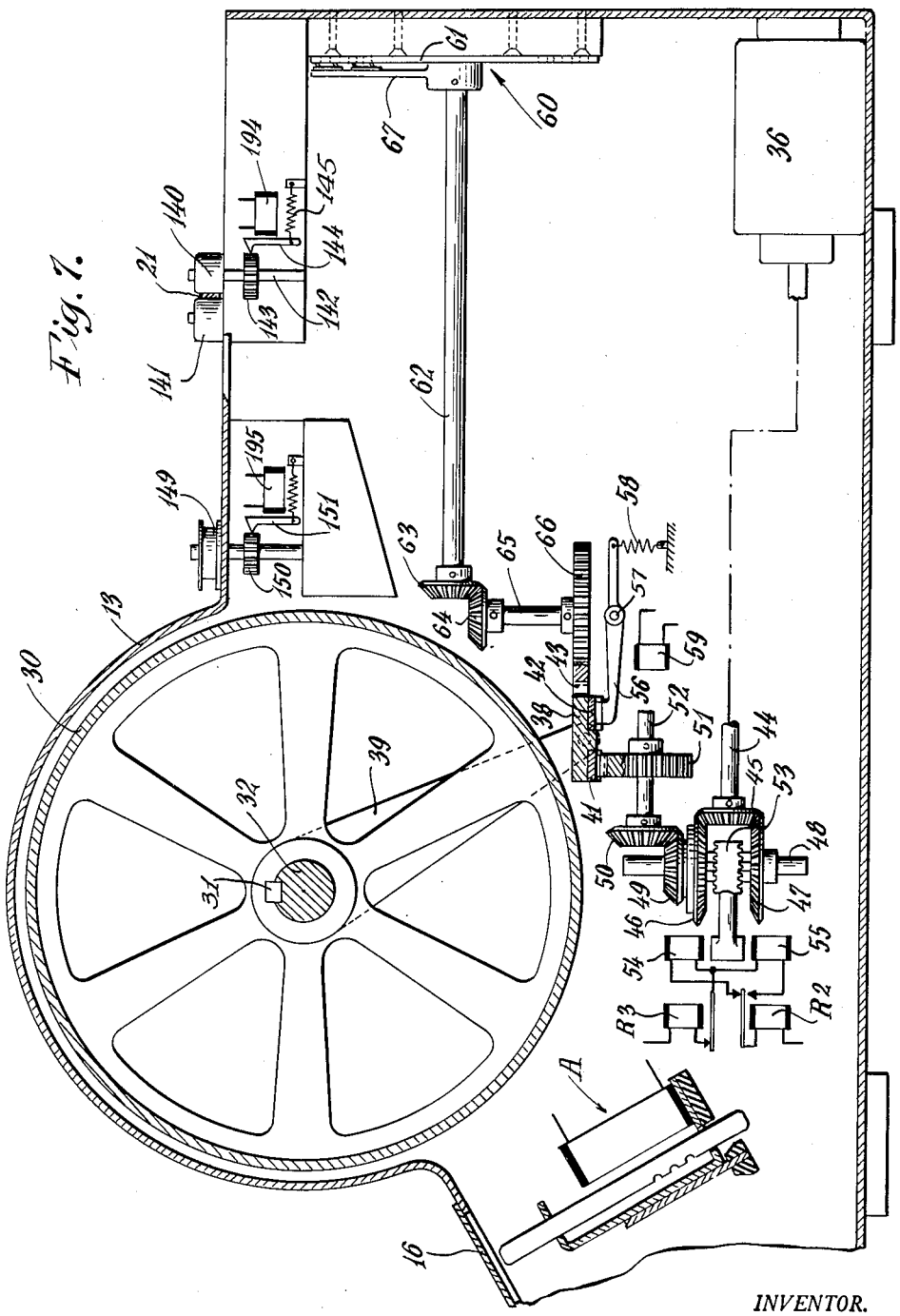

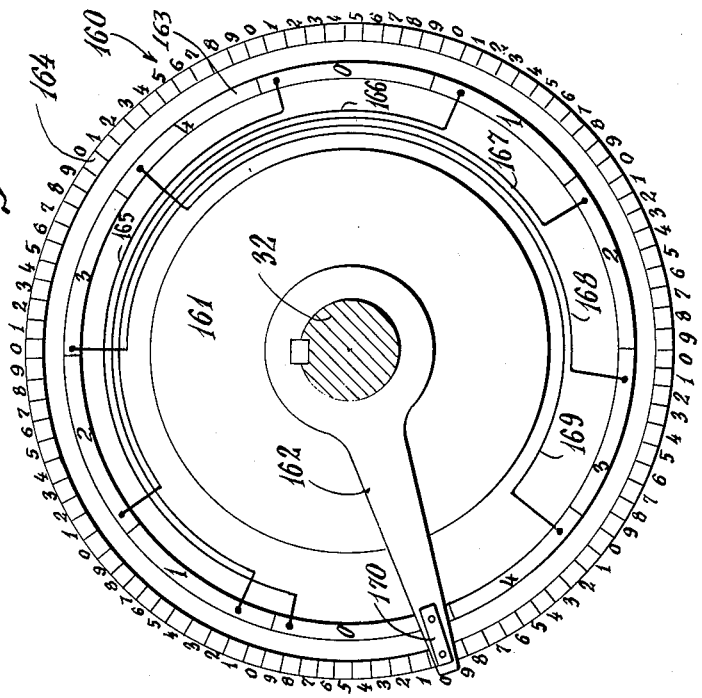
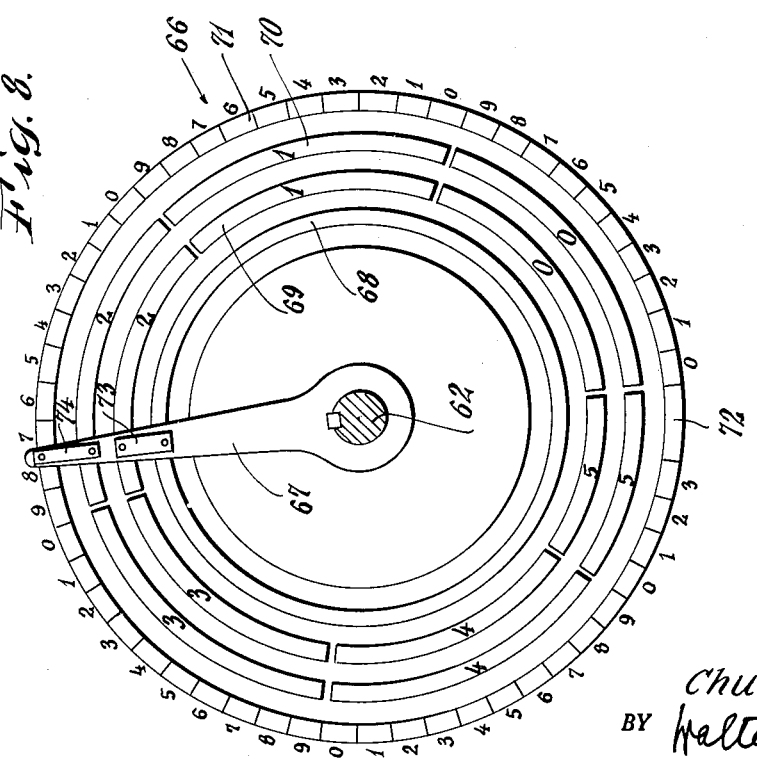

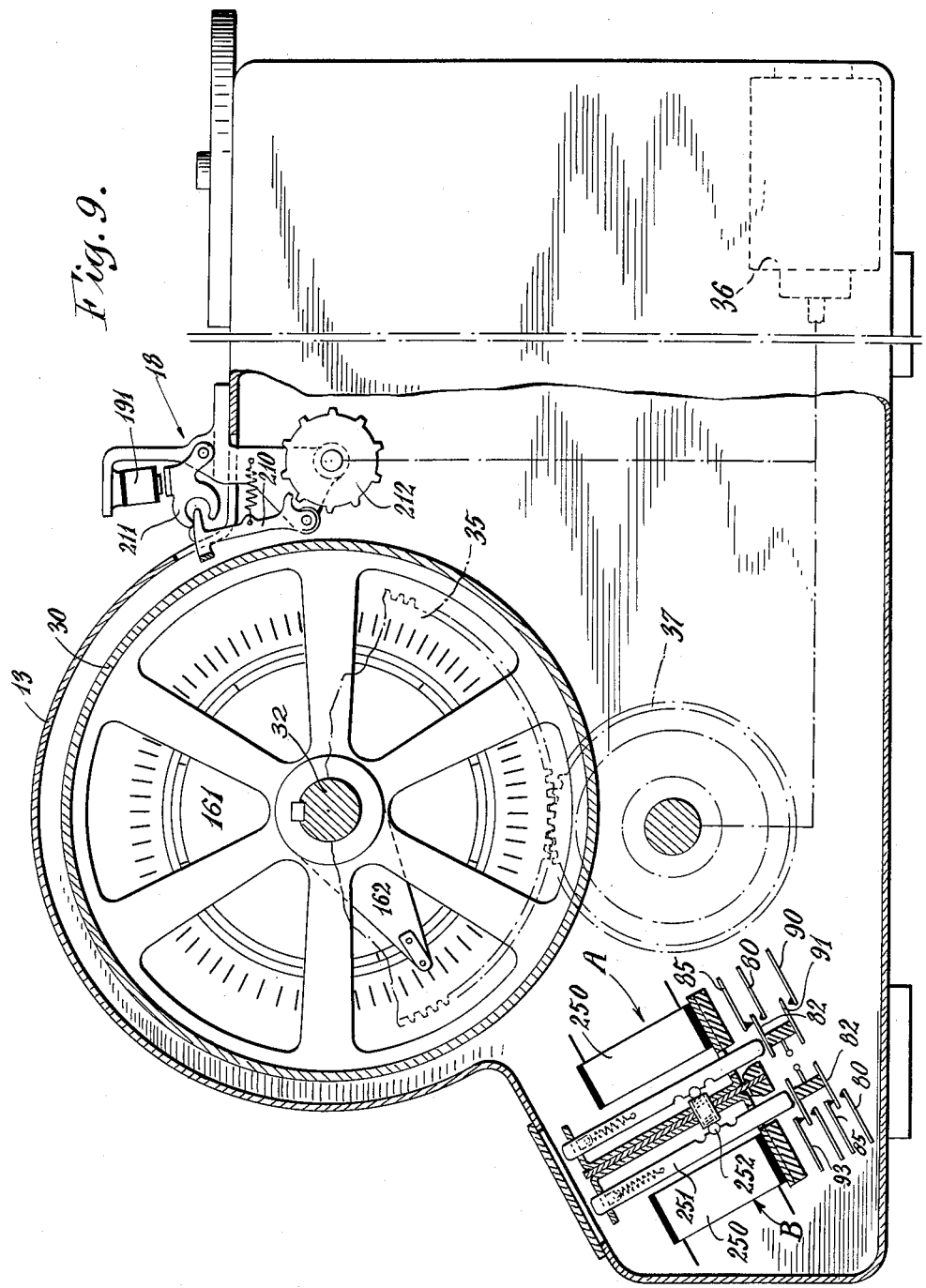

Dec. 27, 1955  CHUNG-CHIN KAO  2,728,816
JAPANESE LANGUAGE TELEGRAPH PRINTER
Filed March 24, 1953  12 Sheets-Sheet 10

INVENTOR.
Chung-Chin Kao
BY Walter S. Alston
ATTORNEY.

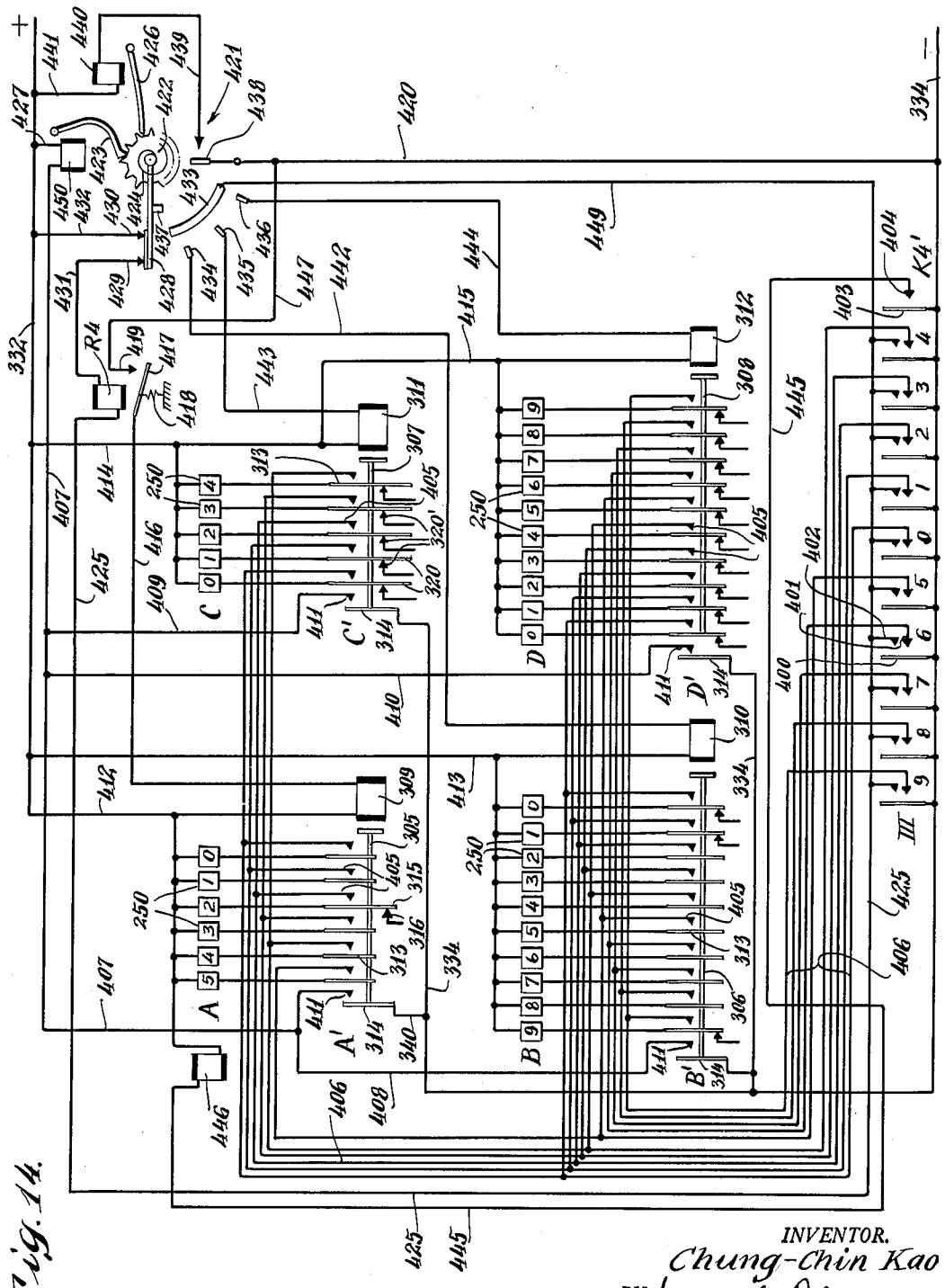

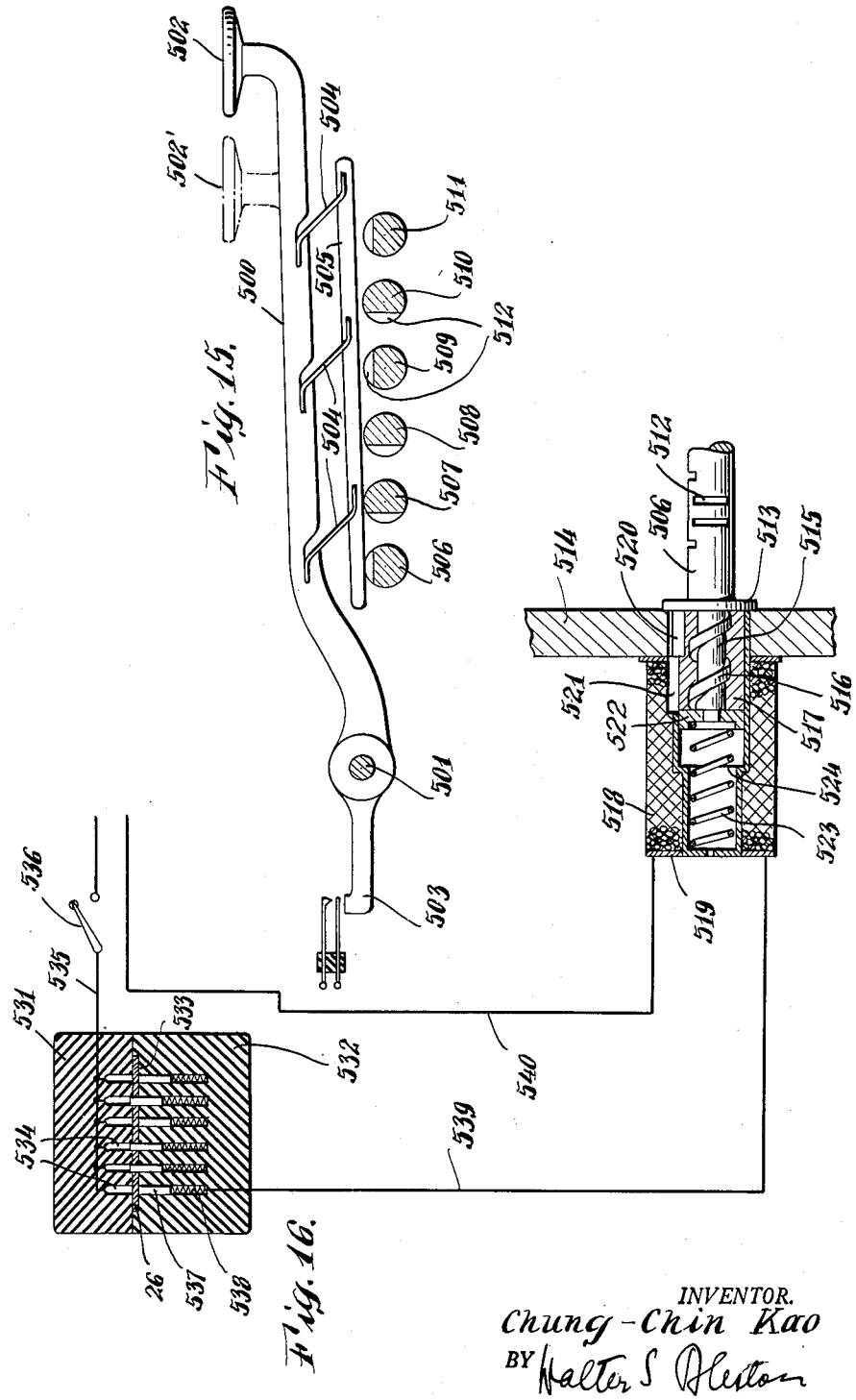

United States Patent Office 2,728,816
Patented Dec. 27, 1955

2,728,816

JAPANESE LANGUAGE TELEGRAPH PRINTER

Chung-Chin Kao, Forest Hills, N. Y., assignor to Trasia Corporation, New York, N. Y., a corporation of New York Application March 24, 1953, Serial No. 344,277

14 Claims. (Cl. 178—39)

The invention relates to a machine for printing ideographic characters of a language or code such as the Japanese or Korean language in which the characters of a relatively small group are used much more frequently than those of a relatively large group of characters, wherein however, characters of both groups are needed in order to write any sentence intelligibly.

The invention aims to provide means for printing the characters of a language or code of the mentioned kind with relatively high speed on a tape, and to render such means applicable for printing communications, e. g. of the Japanese language, in the form of characters conventionally used for writing in such language.

The invention further aims to provide means for operating the mentioned printing means with the aid of a stepwise progressing perforated tape of the conventional Japanese six unit teleprinter code.

Another object of the invention is the adaptation of a machine of the mentioned type to the Morse telegraph circuit by providing a manually operative key board with a set of keys according to the number of characters occurring in the aforementioned small group, and with a set of numerical keys for selecting and printing characters of the mentioned large group by using several keys or repeatedly using the same key for the identification of a specifically selected character.

The application of the machine according to the invention to the Morse telegraph circuit renders it possible to transcribe, e. g. Japanese Morse signals either from a standard ink recorder or a sound recording device into the normal written language. Such transcription cannot be accomplished with the existing Japanese telegraph devices.

Although the invention is equally well applicable to the selecting and printing of ideographic characters of other languages and codes, as e. g. of the Korean language, it will be described hereinafter with reference to the characters of the Japanese written language for which the invention has been found of particular advantage.

In order to make the invention fully understood it will be necessary to explain certain peculiarities of the Japanese written language.

The Japanese written language is composed of phonetic symbols called "Kana," and Japanese-Chinese characters, called "Kanji." Fig. 1 of the accompanying drawing is a chart of the Kanas as appearing in text books of the Japanese written language. The chart shows 51 primary Kanas. However, it will be noticed that the third Kana of the first horizontal row is identical with the third Kana of the tenth row. Similarly, the second and fourth of the first row are identical with the second and fourth, respectively, of the eighth row. Hence, there are a total of forty-eight different primary Kanas. The right-hand side of the chart shows twenty-five secondary Kanas of which the twenty characters of the first to the fourth row are called "Nigori" and the five of the last row are called "Han-Nigori" as marked on the chart. The number of Kanjis is very large. However, a total of between 2200 and 2300 is found to be sufficient to fulfill all requirements of telegraphic communications. In Fig. 2 some examples of Kanjis are illustrated. It will be seen that they differ from the Kanas in their general appearance. The numeral underneath each Kanji is, of course no part of the character. Its meaning will be explained in the description of the invention. It is absolutely necessary to use characters of both groups, Kanas and Kanjis, in order to make a complete sentence. In general, approximately fifty per cent of all characters in a sentence are Kana, and fifty per cent Kanji. Fig. 3 shows a sample sentence in which the Kanjis are marked by a "J." The other characters are Kanas.

The telegraph equipment existing in Japan prints either Kanas or letters of the English alphabet to form a romanized Japanese written language, but it is impossible to add the thousands of Japanese-Chinese characters to any one of the conventional telegraph machines. On the other hand, a Japanese telegram without Kanji will never be satisfactory. Therefore, it is another object of the invention to link the new machine to the teleprinter circuits which exist in Japan so that all telegrams can be printed in both Kanas and Kanjis in the form of the regular written language.

Further objects and details of the invention will be apparent from the description given hereinafter and the accompanying drawing illustrating in Figs. 4 to 16 an embodiment thereof by way of example.

Figure 6:
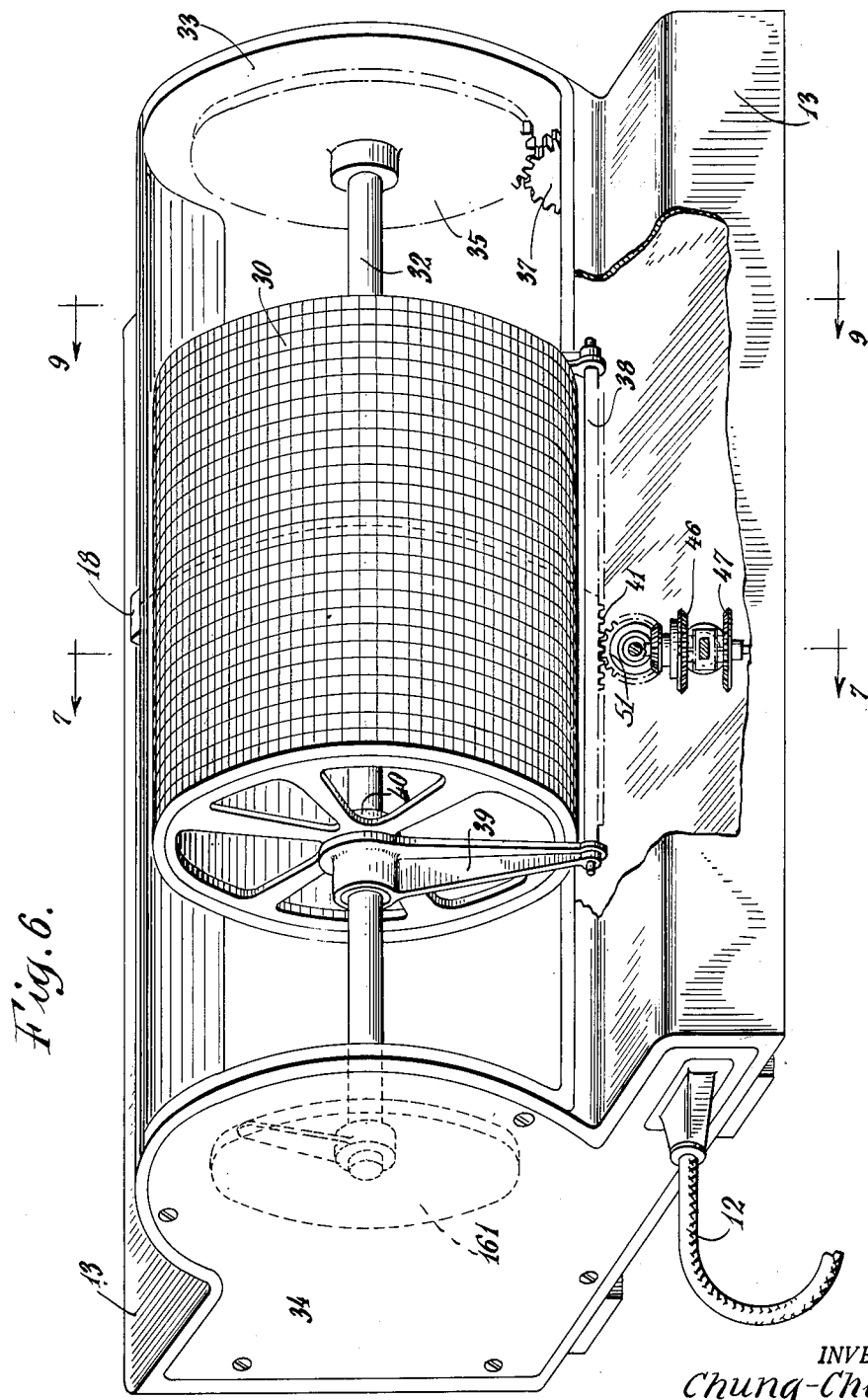
Figure 11:
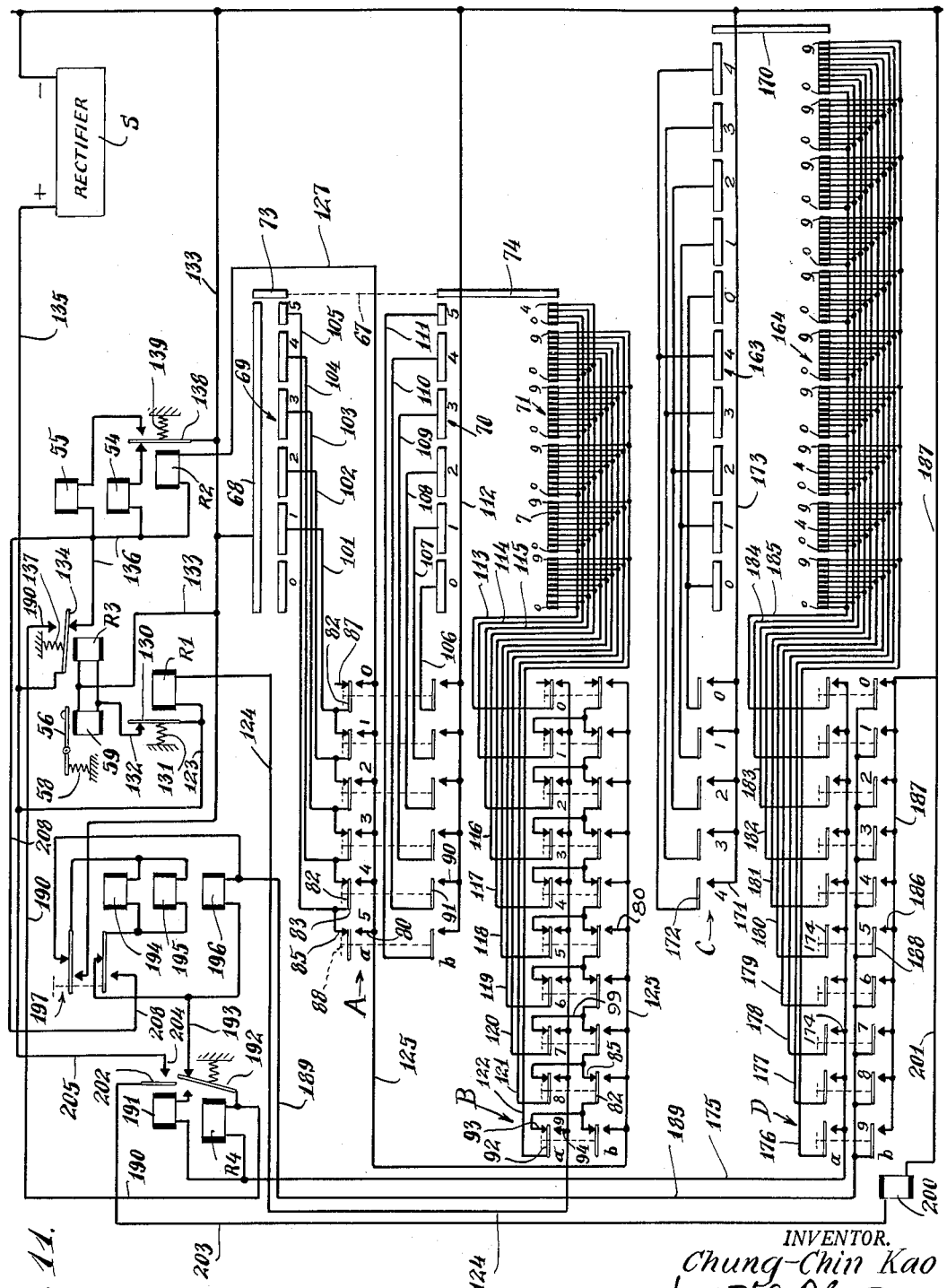
Figure 12:
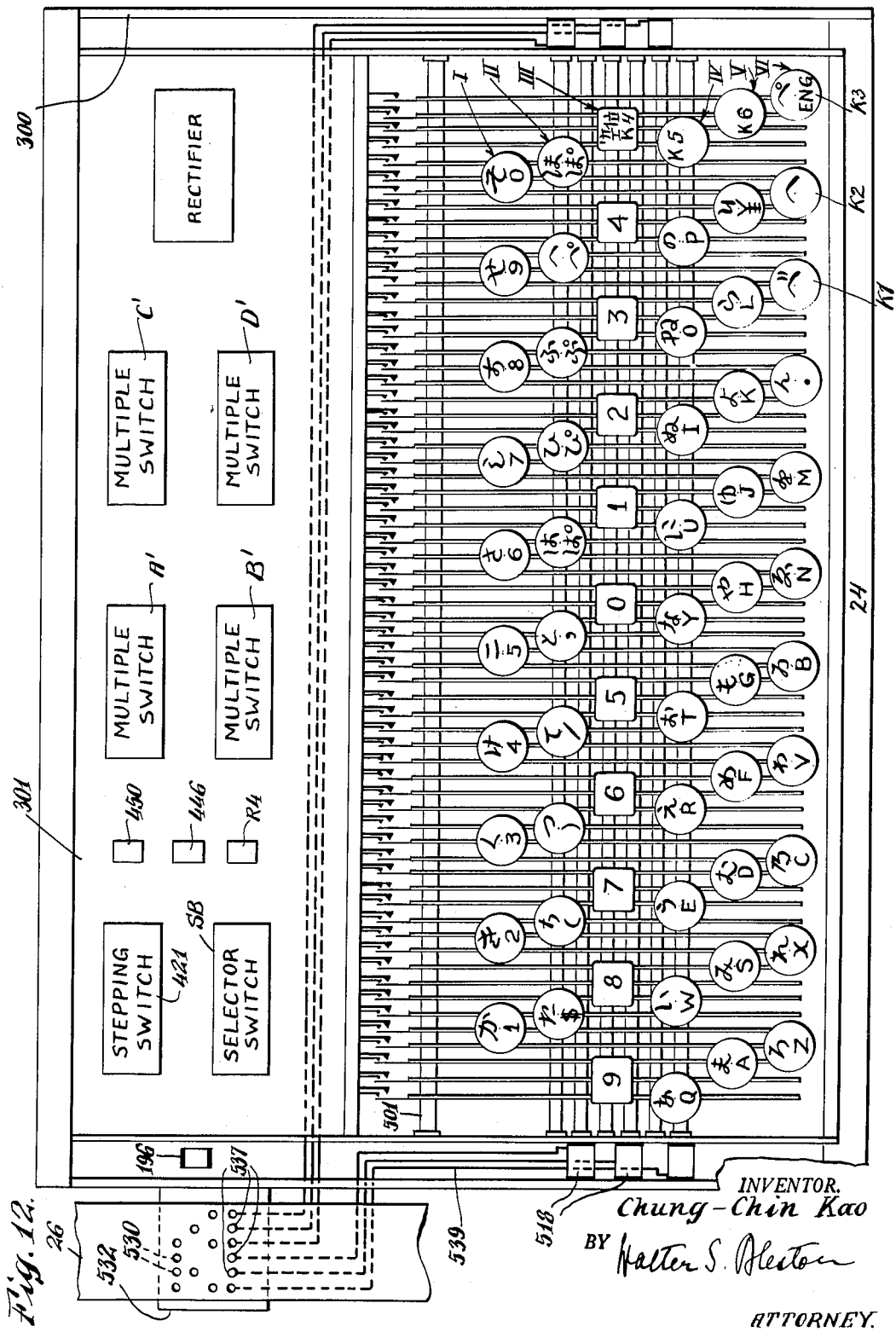
Figure 13:
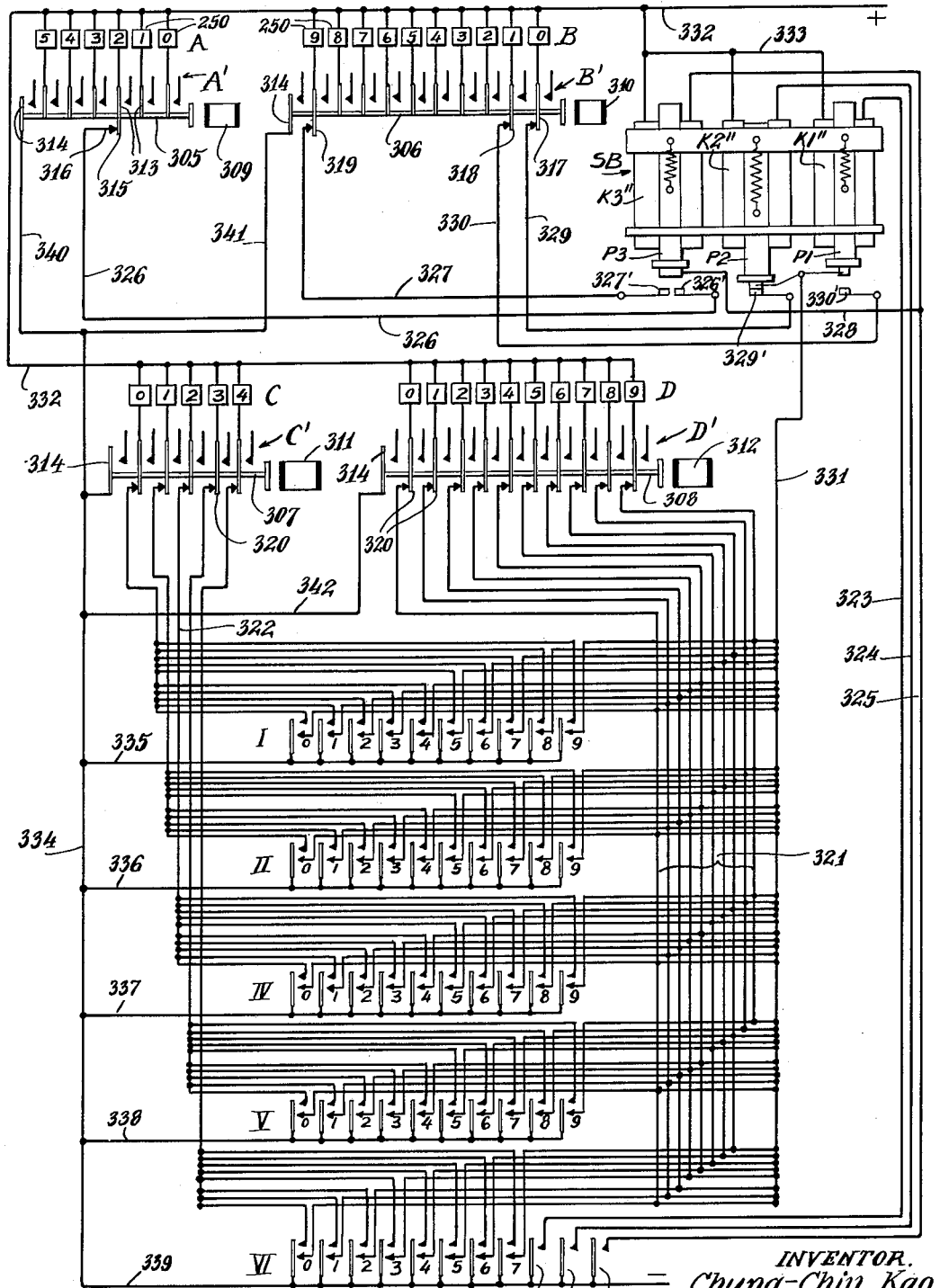

Of these figures:

Fig. 4 is a perspective view of a device according to the invention comprising the printer connected to the key board by cable, Fig. 5 is a chart of the characters and their distribution on a type face cylinder which is a part of the printer of Fig. 4, Fig. 6 is a perspective view of the printer, part of the cover being removed, Fig. 7 is a cross-section along line 7—7 of Fig. 6, Fig. 8 is a front view of a distributor visible in Fig. 7, Fig. 9 is a partial cross-section along line 9—9 of Fig. 6, Fig. 10 is a front view of another distributor visible in Fig. 6, Fig. 11 is a circuit diagram of the switches, relays and solenoids for operating the printer, Fig. 12 is a diagrammatic top plan view of the keyboard of which the cover is removed, Figs. 13 and 14 are circuit diagrams of the parts within the keyboard, Fig. 15 is a side elevation of one of the keys in the keyboard of Fig. 12, the permutation bars for operating the machine with the aid of a stepwise progressing tape, appearing in cross-section, and Fig. 16 is a cross-section of the means for operating the permutation bars of Fig. 15.

It will be noticed that all figures are schematic and show only as much of the parts as necessary for an understanding of the invention.

Referring now to the drawing, Fig. 4 shows the complete machine for automatically transcribing into the written Japanese language communications received on a tape of the conventional six unit teleprinter code. The machine comprises two main parts, the printer 10 and the reader and automatic keyboard 11. The illustrated two parts which for sake of convenience are made of separate units merely connected by a cable 12, may of course be built as one unit. The two-part design is preferred as the part 10 may be readily converted into a Chinese telegraph printer by substituting a type cylinder with only Chinese type characters for the one hereinafter described. In that event the part 11 is not needed. The printer 10 is enclosed in a housing 13 having removable covers uch as indicated at 14, 15, 16 and 17 in order to render he covered parts accessible. In the center of the upper portion of the housing 13, the cover 18 of the printing hammer is visible, as well as a reel 19 and a pair of rollers 20 of a feeding mechanism for a tape 21 to be printed and a pair of rollers 22 of an ink ribbon feeding mechanism. Cable 12 protruding from part 11 is plugged into an outlet 23 to the part 10. Part 11 contains in its front portion the automatic keyboard 24 and has at its left side an extension 25 for receiving and reading a six unit code perforated tape 26 which is moved in the direction of the arrow. The main portion 27 of part 11 contains the means and mechanism for operating the keys of the keyboard according to the reading of the tape.

As the printing device according to the invention follows in many of its parts and its operation, the principle disclosed in the U. S. Patents Nos. 2,412,777 and 2,427,214 granted to me on December 17, 1946, and September 9, 1947, respectively, and in U. S. Patent No. 2,458,339 of January 4, 1949, to E. Buhler and C. A. Berry, only so much structure is shown in the drawing as necessary for an understanding and the following description will be mainly based on diagrammatical illustrations, and, where necessary, will refer to the above patents.

Generally speaking, the printer used in the present invention comprises a type face cylinder rotatable and axially movable in relation to a stationarily located hammer which can be operated to press a paper tape and an ink ribbon against a selected type of the cylinder. The type face cylinder denoted by 30 in Figs. 6 and 7 is splined at 31 to a horizontal shaft 32 which is journaled in the side walls 33 and 34 of the housing 13, so that the cylinder can be axially shifted in relation to the shaft 32 while rotating together with the latter. In this manner any point of the cylinder surface can be brought in registry with the location at which imprints can be made on the tape 21.

The size of the cylinder is to be selected according to the requirements. In the present case a cylinder is chosen with 100 type spaces in a circumferential column and fifty-four type spaces in an axial row. It is obvious that the speed of the operation of the machine depends on the average distance the cylinder has to travel peripherally and axially between the printing of two characters. This distance can be greatly reduced according to the invention by a suitable arrangement of the character types on the cylinder. In the present case, each character is at least once repeated. In other words, the arrangement of the characters on one half cylinder is repeated on the other half. In consequence, as the cylinder rotates in only one direction, maximum rotation between the printing of two characters in sequence will be 180°. Furthermore, it has been stated that there are only forty-eight primary and twenty-five secondary Kanas as compared to thousands of Japanese-Chinese characters and that the Kanas make up about fifty percent of all characters in a written Japanese sentence. For that reason, the primary and the secondary Kanas, with the exception of the Han-Nigoris which do not occur as frequently as the other Kanas, are repeated twelve times on the type face cylinder according to the invention, i. e. six times on each half cylinders. A chart of all characters is shown in Fig. 5 illustrating the development of the type face of a semi-cylinder. In the axial direction, there are six groups, denoted from 0 to 5 at the head of the chart and each of the groups 0 to 4 is subdivided into ten columns numbered 0 to 9, whereas group 5 comprises only four columns 0 to 3. Similarly, in the peripheral direction there are five sections denoted 0 to 4 at the right hand side of the chart, each section consisting of ten rows 0 to 9. According to this chart any character can be identified by a four digit number such as appearing e. g. under the characters in Fig. 2. Of such number of the first or thousands digit indicates the group, the second or hundreds digit the column, the third or tens digit the section, and the fourth or unit digit the row in which the character occurs as shown in Fig. 5. Each of the zero columns of all six groups is made up of the forty-eight primary Kanas. In each column 1 of groups 0 to 5 through sections 0 and 1, all the Nigoris are located. One column identified by the number 2–9 which means column 9 of group 2, is composed of the arabic numerals, some symbols like the dollar symbol, the Han-Nigoris in rows 5 to 9 of section 1, and the letters of the English alphabet. This column allows the printing of messages in the English language.

The blank fields of the groups 0 to 2 are for 1240 Kanjis of comparatively higher frequency of use. This arrangement is helpful further to reduce the lateral travelling distance of the type face cylinder. The blank fields in groups 3, 4 and 5 are for 990 less frequently used Kanjis to make up the total of 2230 Kanjis or Japanese-Chinese characters. As stated above the whole arrangement of the chart of Fig. 5 is repeated on the other half of the cylinder. It will of course be understood that the numerals used for the identification of the groups, columns, sections and rows of the chart do not appear on the actual cylinder.

Means are provided to rotate the cylinder 30 continuously and to shift it in axial direction during the rotation. Inasmuch as the aforementioned Patent Number 2,458,339 contains a very detailed description and illustration of the structure of similar means it appears to be sufficient to show such means in a diagrammatical manner and to describe them by their function rather than by their structure. A gear wheel 35 is secured to the shaft 32 and continuously driven in the same direction by an electric motor 36 through a transmission of which only one wheel 37 is visible in Fig. 9. In order to provide for the axial movement of the cylinder, a bar 38 is located lengthwise of the cylinder. An arm 39 is secured to each end of the bar and journaled on the hub 40 of the cylinder. Thus the cylinder can be rotated in relation to the bar but will follow any axial movement of the latter. Bar 38 is provided with three sets of rack teeth. The first set 41 and the second set 42 are arranged on the lower face of the bar and the third set 43 is arranged on the side remote from the cylinder. The first set of teeth 41 serves to drive the bar through a reversible transmission which in the illustrated embodiment comprises a shaft 44 continuously driven by and connected with the motor 36 through means not shown. Shaft 44 has secured thereto a bevel wheel 45 meshing with a pair of bevel wheels 46 and 47 freely rotatable but not axially shiftable on a shaft 48 near the upper end of which another bevel wheel 49 is fixed. Wheel 49 is in mesh with a wheel 50 which together with a spur wheel 51 is secured to a shaft 52. Spur wheel 51 is in engagement with the rack teeth 41. Intermediate the bevel wheels 46 and 47, a coupling piece 53 in splined on shaft 48. By shifting piece 53 against wheel 46, the wheel will be coupled to shaft 48 so as to rotate the latter in one direction whereas by shifting the piece 53 against wheel 47, this wheel will be coupled to the shaft and the direction of rotation will be reversed. The movement of the piece 53 is controlled by two solenoids 54 and 55 which shift the piece in the one or other direction depending on which solenoid is energized. When none of the solenoids is energized the coupling piece will be shifted by springs not shown to avoid over-crowding of the drawing, in a central position in which none of the wheels 46 and 47 is coupled to shaft 48. The electric circuits for energizing the solenoids will be described later on. If in Fig. 7 solenoid 54 is energized, piece 53 will have coupled wheel 46 to shaft 48. Thus, it will be clear that motor 36 will cause a shifting of the bar 38 and with it of cylinder 30 to the right or left hand side in Fig. 6, according to the direction of the rotation of the motor, via shaft 44, wheels 45 and 46, coupling piece 53, shaft 48, bevel wheels 49 and 50, shaft 52 and wheel 51, and that the cylinder will be shifted in the opposite direction when solenoid 55 is energized rather than solenoid 54. Alternative energization of the solenoids 54, 55 will be accomplished with the aid of relays as it will be described hereinafter.

Means are provided to stop the axial movement of the cylinder when the column containing a selected type is in a position in which printing can occur, i. e. when that column is in registry with the printing device 18. For this purpose a latch 56 is pivoted at 57 so that it can engage in the intervals of the teeth 42 which are spaced from one another according to the width of the columns on the type face cylinder. In other words as there are fifty-four columns there are also fifty-four intervals (or fifty-five teeth 42) in which the latch 56 can engage under the action of a spring 58. The latch can be withdrawn from engagement by a solenoid 59.

Printing of a selected character of the column stopped by the latch 56 in registry with the printing device is accomplished by means of a hammer 210 shown in Fig. 9 and which in a position of rest is retained by a movable holder 211. When, however, the holder is removed from its holding position by energization of a solenoid 191 the hammer 210 can be impelled by a cam wheel 212 which is driven by motor 36 through means not shown to strike the type in registry with it, and then, to return immediately to its position of rest. A detailed description of the printing device is given in the aforementioned U. S. Patent No. 2,458,339 which also describes a tape and an ink ribbon feeding mechanism of the kind which may be used in the machine according to the invention. These mechanisms are diagrammatically indicated in Fig. 7 where the mechanism for feeding the tape 21 comprises two rollers 140 and 141 between which the tape is engaged. Roller 140 is mounted on a shaft 142 to which a ratchet wheel 143 is secured. A pawl 144 operative by a spring 145 and a solenoid 194 will turn the ratchet wheel so that the roller 140 will feed the tape the space of one character each time the solenoid is energized. The mechanism for feeding the ink ribbon is very similar. It comprises the driven roller 149, ratchet wheel 150, pawl 151 and solenoid 195.

In order to control the operation of the latch 56 and of other parts of the machine, a distributor 60 is provided, the controlling element of which moves in synchronization with the bar 38. The distributor is attached to the rear wall of the housing as shown in Fig. 7 and comprises a stationary disc 61 in the center of which a shaft 62 is journaled. A bevel wheel 63 is secured to the other end of the shaft and meshes with a wheel 64 on another shaft 65 which carries a spur wheel 66 engaging the third set of teeth 43 of the bar 38. Facing the disc 61 a wiper 67 is keyed to shaft 62. The disc 61, as best seen in Fig. 8 is provided with four contact rings. The innermost ring 68 is uninterrupted. The second ring 69 and the third ring 70 are divided in six segments according to the number of groups in Fig. 5. The segments are numbered from 0 to 5, and it will be noted that the segments 5 are shorter than the other segments. The outermost ring 71 is so divided that there are ten separate contacts numbered 0 to 9 in registry with each of the segments 0 to 4 of the ring 70. In registry with segment 5 of ring 70, only four contacts 0 to 3 are provided on ring 71 and in addition thereto a short free space 72. Hence, there are fifty-four contacts on ring 71, that means as many as there are columns of types on cylinder 30. The wiper arm 67 has two contact pieces 73 and 74 of which the piece 73 bridges the rings 68 and 69 whereas piece 74 bridges rings 70 and 71.

The rings 68 to 71 are connected to two contact banks A and B located underneath the housing cover 16 in Fig. 4. In the circuit diagram of Fig. 11, the rings 68 to 71 are shown as straight parallel lines in order to facilitate the tracing of the connections. The wiper 67 appearing on the right hand side is to be assumed to move in Fig. 11 in a direction parallel to the straightened rings. The segments and contacts are numbered the same as in Fig. 8. The contact banks A and B are shown on the left side. As stated hereinbefore, a very essential feature of the present invention is the speed with which the machine operates. Considering the arrangement of the types according to Fig. 5, and presuming that a type of column 5 in group 2 had just been printed and that the next type to be printed is within one of the lower numbered columns of the same group or in a lower numbered group, it is desired that the cylinder upon selection of that next type immediately starts to travel towards the right hand side, whereas if the group and/or column numbers are higher, the cylinder should travel towards the left hand side regardless what the direction of its preceding axial movement was. Therefore, the contact elements of the contact banks have the double task namely, first to cause the cylinder to travel in the proper direction, and second to cause the cylinder to stop at the selected column. For this reason, each of the contact elements consists of two parts. Those parts of the contact elements which control the direction of the cylinder movement to the right or left are shown in rows $a$ of bank A and $b$ of bank B, whereas the parts in the rows $b$ of bank A and $a$ of bank B control the operation of the latch 56. The contact elements are further marked with the number of the group or column which they serve, so that for instance an element A3 is coordinate with the group 3, and a contact element part B4$a$ is coordinate with the columns 4 and is a part of the latch control. In bank A, each of the parts $a$ of all the elements have a fixed contact denoted by 80 and all the fixed contacts 80 are connected to a line 125. Each of the elements 1 to 5 has a conductive arm 82 which is pivoted at 83. The arm is movable between the associate contact 80 and another contact 85. Normally, the arms 82 are so positioned that they bear against the fixed contacts 85. If the arm 82 is depressed at 88, contact is made between 82 and 80. It is further to be noted, that in element 0, the contact arm 82 when at rest, bears against a stop 87, and that element 5 has an arm 88 which is not connected to any line. The $b$ part of each element comprises a fixed contact 90 and a movable contact arm 91. The contact arms 82 and 91 are mechanically connected and when depressed contact will be established between 90 and 91. In bank B, the parts $b$ of the contact element are of the same structure as the parts $a$ of the elements of bank A. The parts $a$ of bank B have each a movable contact arm 92 which when at rest bears against a fixed contact 93 conductively connected to the contact arm 82 of the adjacent lower numbered element. When depressed the arm 92 bears against a fixed contact 94. In bank A, the arms 82 of the elements 0 to 4 are connected to the sections 1 to 5, respectively, of the distributor ring 69 through lines 101 to 105, respectively. The movable arms 91 of the parts $b$ of the bank A are connected through lines 106 to 111, respectively to the sections of ring 70 whereas all the contacts 90 are connected to a line 112. In bank B each of the movable contact arms 92 of the parts $a$ is connected to all contacts of ring 71 which have the same number as the element to which the contact arm belongs. Lines 113 to 122 establish these connections. It is further to be noted that the elements of the banks A and B are of such a well known type that if one element of a bank is depressed any other element previously depressed in the same bank will be released.

A D.-C. power source S such as e. g. a 110-volt rectifier is provided to operate the various relays and solenoids among which there is in the first place a relay R1 which controls on the one hand the solenoid 59 for operating the latch 56 and on the other hand the relay R3 for energizing the solenoids 54 and 55 for the coupling piece 53. Relay R1 is connected through a line 123 to the positive pole of the electric current source S, and through a line 124 to all the fixed contacts 94 of the parts *a* of bank B. The fixed contacts 80 of the *a* parts of the A bank and of the *b* parts of the B bank are connected through lines 125 and a line 127 to the one terminal of the relay R2, whereas all the fixed contacts 90 of the *b* parts of the elements of bank A are connected through line 112 to the negative terminal of the source S.

When relay R1 is deenergized as in Fig. 11, a contact arm 130 biased by a spring 131 connects a line 132 to line 123 so as to admit current to the latch solenoid 59 and the coupling relay R3 which are connected to the negative pole through line 133. Relay R3 thus energized, attracts a contact arm 134 which conducts current from line 135 to a branched line 136 to which the two solenoids 54 and 55 and the other terminal of relay R2 are attached. When then relay R2 is energized its contact arm 138 connects solenoid 54 to the line 133, whereas a spring 139 tends to retract the arm 138 to connect solenoid 55 when the relay R2 is deenergized.

If relay R1 is energized it will attract arm 130 thereby opening the circuit through solenoid 59 and relay R3. In consequence solenoid 59 will release the latch 56 which will engage the rack bar 38. Simultaneously arm 134 will be retracted by a spring 137 to conduct current from line 135 to a line 190 leading to the printing hammer device as it will be explained later on.

The mechanism so far described accomplishes the axial shifting of the type face cylinder and its stopping in a selected position in the following manner. Presuming that at the start of the operation the 0 contact elements of both the A and B banks are depressed and thus the cylinder is in its right hand end position, i. e. with column 0, group 0 in registry with the printing position, current can flow from + through lines 135, 123, relay R1, line 124, contact B0*a*, line 113, contact 0 of the first group of ring 71, wiper contact 74, section 0 of ring 70, line 106, contact 90 of A0*b*, and line 112 to —. In consequence relay R1 is energized and has opened the connection between 130 and 132, and solenoid 59 and relay R3 are deenergized. Latch 56 is pulled by its spring 58 into teeth 42 of rack bar 38. Contact arm 134 is retracted by spring 137 to close the printing circuit between lines 135 and 190, whereas relay R2 and solenoids 54 and 55 are deenergized with the result that the coupling piece 53 releases the bevel wheel to which it had previously been coupled and the mechanical driving connection between the motor 36 and the bar 38 is interrupted.

If now another set of contact elements is depressed e. g. the elements A1 and B7, in order to select the eighth column of the second group of characters, the elements A0 and B0 will be released as stated hereinbefore. Now the current through relays R1 will be interrupted as the wiper 67 is still in the position establishing connection between the zero contacts of rings 70 and 71. In consequence, spring 131 pulls arm 130 forward to establish connection between 123 and 132 and to energize solenoid 59 and relay R3. Thereby the latch 56 will be withdrawn from the bar 38 so that the cylinder can move and one of the solenoids in the drawing solenoid 54, depending on the position of contact arm 138 will couple the coordinate wheel 46 or 47 with the piece 53 owing to the current flowing from line 135 through arm 134, line 136, solenoid 54, arm 138 and line 133 to —. Now current can flow through the branch line 136, relays R2, lines 127, 125 and the part *a* of the depressed contact element, as the connection through contact 80 and arm 82 of element A2 and line 103 towards the negative pole is interrupted between rings 68 and 69, the wiper contact 73 still being positioned on the 0 section of ring 69. Similarly, no current can flow through line 125 and the bank B as the connection is interrupted between rings 70 and 71. As relay R2 is not energized, the spring 139 swings arm 138 over so that now solenoid 55 will be energized rather than 54, and wheel 47 will be driving to move the cylinder towards the left hand side. In synchronization with the cylinder movement, the wiper 67 of the distributor 60 will be turned by the transmission comprising the parts 62 to 66 until it reaches the position in which the wiper contact piece 73 engages the section 1 of ring 69 and contact piece 74 engages the section 1 of ring 70 and contact 7 of the corresponding section of ring 71. When this position has been reached conditions as first explained with respect to the "00" setting are established so that the cylinder movement is stopped at column "1–7."

The switching over from solenoid 54 to 55 as hereinbefore described was due to the fact that one or both of the groups and column numbers selected in the second instance was higher than in the first instance. Conversely if the subsequent number is lower relay R2 will be energized to switch in solenoid 54. Presume that the column "2–5," i. e. the sixth column of the third group is selected after the column "2–7." Then contact will be established between 135 and 136 while the wiper is still in the "2–7" position. Now, however, current will flow from line 136 through relay R2, lines 127 and 125 contacts 80 and arm 82 of element 5 in bank B, and further on through the arms 82 of the elements 6 and 7, connecting line 99 of element 7, line 120, contact 7 of the third group of ring 71, wiper piece 74, ring 70, section 2, line 108, depressed contact arm 91 of element 2 in bank A*b*, contact 90 and line 112 to —. Thus, reversal of the axial movement of the cylinder is attained.

The control system for the rotation of the type face cylinder and the printing device is illustrated in Figs. 9, 10 and 11. In Fig. 9 the mechanism for shifting the cylinder in axial direction has been omitted for sake of better clearness and in view of the fact that this mechanism has been shown in Fig. 7. It has been stated, hereinbefore, that the cylinder 30 is continuously rotated by motor 36 through a transmission including gear wheels 37 and 35 of which wheel 35 is secured to the shaft 32. Coaxially with the same shaft another distributor generally denoted by 160 is arranged. It comprises a disc 161 secured to the inside of the housing wall 34 and a wiper 162 fixed to the shaft 32, and thus, rotating at the same speed as cylinder 30. As shown more clearly in Fig. 10 the disc is provided with two contact rings of which the inner ring 163 is divided in 10 equal sections and the outer ring 164 in 100 contacts. The sections of ring 163 correspond to the sections, and contacts of ring 164 correspond to the rows of characters shown in Fig. 5. The diametrically opposite contacts of ring 164 are electrically connected in view of the fact that, as stated hereinbefore, the character types on the one half cylinder are repeated on the other half cylinder. The connecting lines of the sections which number twice from 0 to 4 are visible in Fig. 10 and denoted by 165 to 169. The contacts of ring 164 adjacent each section of ring 163 are numbered 0 to 9, the same as the horizontal rows of characters in Fig. 5. The wiper 162 is provided with a contact piece 170 whereby one contact of ring 164 after the other can be connected to the adjacent section of ring 163 as the wiper rotates.

The sections of ring 163 are connected to contacts of a contact bank C and the contacts of ring 164 are connected to contacts of a contact bank D as shown in Fig. 11. The contact banks C and D are located underneath the covers 17 visible in Fig. 4. In the circuit diagram of Fig. 11 the rings 163 and 164 are shown developed in the form of straight strips divided in sections and rows, respectively. The contact elements of bank C are individually marked 0 to 4 according to the associated section numbers. Each of the elements e. g. the element C–3, comprises a fixed contact piece 171 and a contact arm 172. All the contact pieces 171 are connected through a line 173 to the negative terminal of the power source S. The contact elements of the bank D denoted 0 to 9 according to the associated rows of characters consist each of two parts *a* and *b*. Each part *a* is formed similar to the elements of bank C. All the fixed contact pieces 174 are connected to a common line 175, and each arm 174' is connected with all equally numbered contacts of the ring 164. These connecting lines are denoted by 176 to 185, respectively. For example, the arm 174' of the bank part D–*a*–4 is connected through line 181 to all the "4" contacts of ring 164. In each of the *b* parts of the elements of bank D, a fixed contact 186 is connected to a common line 187 which leads to the negative pole of the power source S, whereas all the movable contact arms 188 are connected to a common line 189 the purpose of which will be described hereinafter.

It has been shown that relay R1 will be energized when the cylinder reaches a selected axial position at which moment solenoid 59 and relay R3 will be deenergized. Thereby, the axial movement of the cylinder will be stopped and current can flow through line 190 to the printing solenoid 191, and from there through line 175 to the *a* part of bank D.

The printing mechanism operates in the following manner. If as hereinbefore described the axial movement of the cylinder has been stopped with the selected column in printing position, relay R3 has released the arm 134 which now contacts the end of line 190. The cylinder continues to rotate and with it the wiper 162. When now the contact piece 170 connects the ring section and contact which corresponds to the selected contacts of the C and D banks, current can flow from + through the line 135, arm 134, line 190, relay R4, line 175, the *a* part of the selected contact of bank D, ring 164, wiper piece 170, ring 163, the selected contact of bank C, and line 173 to —. In consequence, arm 192 will be attracted and solenoid 191 will be energized to cause striking of the printing hammer. The relay R4 controls a spring biased switching arm 192, which when relay R4 is energized establishes a connection between line 190 and the solenoid 191, otherwise between 190 and a lead 193 to the three solenoids 194 for the stepwise advancement after each printing operation of the printing tape, 195 for the ink ribbon and 196 for the perforated tape 26 (Fig. 4). The three solenoids 194, 195 and 196 are further connected to the aforementioned line 189. It is to be noted that solenoid 196 is located in the keyboard part 11 and the lines connecting it to the lines 189 and 193 are parts of the cable 12. A key 197 is provided which in the illustrated normal position connects the two solenoids 194 and 195 in parallel to solenoid 196. If, however, the key 197 is depressed, the solenoid 196 for the perforated tape remains connected as before, whereas both the solenoids 194 and 195 will be disconnected from line 193 and will be directly connected through a line 208 to line 136. Key 197 serves as a spacer key as it causes a shift of the paper tape and the ink ribbon when depressed and then released.

Another solenoid 200 is provided for the operation of a release which when actuated causes the return of any contact of the bank D, which may be depressed to its open positions. This solenoid is connected to line 187 through a line 201, and on the other hand to a contact arm 202 through a line 203. The arm 202 projects with its free end in the path of contact arm 192 of the printing device and is spaced from a fixed contact 204 connected through a line 205 to line 135. When arm 192 turns from the illustrated position in counterclockwise direction it will turn arm 202 which will fall back to its original position when arm 192 has passed arm 202 without further effect. If, however, arm 192 swings in the opposite direction it will cause arm 202 to bear against contact 204 before arm 202 falls back. Thereby relay 200 will be momentarily energized and cause all bank D contacts to open immediately after a printing operation.

During this phase of operation the tapes and the ink ribbon cannot be automatically moved as the connection between arm 192 and line 193 is interrupted. As soon, however, as owing to the subsequent selection of another character, connection between arm 192 and line 193 is established the solenoids 194, 195 and 196 will be energized and the tapes and the ribbon will be fed forward one space. Simultaneously arm 192 will have caused arm 202 to close contact with 204 for a short moment so that a current could flow from + through lines 135, and 205 contacts 204, 202, line 203, solenoid 200, lines 201 and 187 to —. Thereby the solenoid 200 has been shortly energized to cause the release of the contact of bank D which had been depressed.

The second main part 11 of the teleprinter according to the invention comprises the aforementioned key board 24 which may be actuated manually or by a six unit code teleprinter permutation system described hereinafter.

The key board 24 operates on the contacts of the banks A, B, C and D. For this purpose each of the contacts is provided with a solenoid 250 as shown in Fig. 9, and each contact is also provided with a switch member 251 into which a detent bar 252 engages. When the solenoid is energized and the switch member is thereby depressed, bar 252 will detain it in the depressed position but will release it when another contact of the same bank will be depressed. The contact banks may be otherwise of a conventional type.

The keyboard 24 as shown in Fig. 12 is provided with 64 keys arranged in siz horizontal rows denoted I–VI, and of which the rows I and II consist each of ten keys and the other rows each of eleven keys. Six keys of the total of sixty-four are function keys. The function keys are denoted K1 to K6. Keys K1, K2 and K3 are located at the right hand end of the row VI whereas keys K4, K5 and K6 are at the ends of the rows III, IV and V. Keys K5 and K6 are spare keys for use in the event it is desired to install and use a paper carriage with this kind of apparatus. The type keys of rows I, II, IV, V and VI are marked in their upper portions with the forty-eight different primary Kanas so that each row contains the same Kanas as the columns 0 of the groups of the chart Fig. 5. Thus, the ten Kanas, e. g. of the section 0 of Fig. 5 appear on the keys of the row I, and the eight Kanas of section four are the same as on the keys of row VI. As to be explained hereinafter, the twenty keys of the rows I and II are also used for the printing of the twenty Nigoris which occur in the columns 1 of Fig. 5 and which differ from the similar primary Kanas merely by the added diacritical sign. The lower portions of the key rows I, II, IV, V and VI are provided with the numerals, symbols Han-Nigoris, and English letters in accordance with the column 9 of group 2 in Fig. 5. Row III differs from the other rows in that the keys thereof except key K4 are marked with numerals. The shape of these keys are preferably different too in order to distinguish them readily from the other keys. The keys of row III are numbered from 9 to 5 and from 0 to 4 in adaptation to the operator's fingers of the left and right hand if and when used on these keys. Row III serves for printing the Chinese characters or Kanjis which according to the samples given in Fig. 2 are identified by four-digit figures. In printing of such character, each digit requires the depression of the correspondingly numbered key. The selection of a Kana marked on a key of another row requires the use of only one type key.

In order to print primary Kanas indicated on the upper portions of the keys of rows I, II, IV, V, VI, the function key K2 is first to be depressed. The characters or symbols shown on the lower portions of these keys require previous depression of key K3. In addition the keys of rows I and II will print the twenty Nigoris if key K1 is depressed. The electrical connections between the key board and the contact banks of the part 10 are shown in Figs. 13 and 14. Fig. 13 illustrates the various circuits and switches for the printing of the Kanas whereas Fig. 14 illustrates the switches, connections etc., for the printing of the Chinese-Japanese characters or "Kanjis."

In Fig. 13 switches are shown which are operated by depressing the keys of the key board. These switches are denoted with the numerals 0 to 9 added to the numbers of the rows so that, for instance, switch II–3 is the fourth switch in row II. In row VI switches are denoted from 0 to 7, and the three last switches are denoted K1', K2' and K3'. A seelctor bank SB is provided which comprises three solenoid-actuated switches operable by the keys K1, K2 and K3, respectively, and accordingly denoted K1'', K2'', and K3''. The switches of bank SB are of a type similar to that of the banks A, B, C and D, that means that by actuating one of the switches the switch previously actuated will be automatically opened. There are furthermore four multiple switches denoted A', B', C' and D', coordinate with the aforementioned contact banks A, B, C and D. The multiple switches comprise armature members 305, 306, 307 and 308 which may be attracted by coordinate solenoids 309, 310, 311 and 312. Each armature member has upper contact arms, one more than there are contacts in the coordinate contact bank. For instance, there are seven upper contact arms in multiple switch A', six of which denoted by 313 are connected to the diagrammatically illustrated solenoids 250 of bank A. The seventh contact arm 314 is for a purpose which will be described hereinafter. Armature member 305 has one lower contact arm 315 which is connected with the upper arm 313 of contact 2 of contact bank A. Contact 315 lies against the cooperating contact point 316. In a similar manner, armature member 306 is provided with a lower contact arm 317 connected with the solenoid 250 of contact 0 of contact bank B. Another contact arm 318 is connected to contact 1, and a lower contact arm 319 connects the solenoid of contact 9 of the bank. In the multiple switches C' and D', the armature members 307 and 308 are provided with as many lower contact arms 320 as there are upper contact arms, and each of them is connected through the associate upper contact arm to the solenoid of the coordinate contact of banks C and D, respectively.

All the switches numbered 0 of the rows I, II, IV, V and VI are connected through one of the lines of the bundle 321 to that lower contact arm 320 which leads to the solenoid of contact 0 of bank D. Similarly the switches numbered 1 are all connected to the lower arm associated with solenoid 1 of bank D. The same kind of connections are established for the other switches of the rows. Furthermore, all the switches of row I are connected through one of the lines of a bundle 322 to that lower arm 320 of multiple switch C' which leads to the solenoid of contact 0 of bank C. Similarly the switches of rows II, IV, V and VI are connected through other lines of the bundle 322 to the other lower arms 320 of armature 307 and thus to the solenoids of contacts 1, 2, 3 and 4 respectively of bank C. In the position of Fig. 13 in which the solenoids 309, 310, 311, 312 are not energized all lower contact arms bear against their contact points, whereas the upper contact arms are disengaged from other contact points the purpose of which will be described with reference to Fig. 14. Switches K1', K2' and K3' are connected by lines 323, 324 and 325 to the solenoids K1'', K2'' and K3'', respectively, of the selector bank SB. Solenoid K1'' actuates the contact plunger p1 which constitutes its armature and which is connected through a line 331 with all the switches of the five rows I, II, IV, V and VI. Plunger p2 of solenoid K2'' is also connected with line 331, whereas plunger p3 is connected to line 325 through a line 328. Lines 326 and 327 lead from the contact points against which lower arm 315 of multiple switch A' and arm 319 of multiple switch B1 bear, to contact points 326' and 327' respectively, both being located underneath plunger p3. Similarly, lines 329 and 330 lead from the contact points of the lower arms 317 and 318 of multiple switch B' to contact points 329' and 330' respectively underneath the plungers p2 and p1. It will be noted that plunger p2 is shown in the depressed, i. e. the contacting position whereas plungers p1 and p3 are raised. There are furthermore connections made through a line 332 between the positive terminal of a direct current source (not shown) and all the solenoids 250 of the banks A, B, C and D, and also through line 333 between the positive terminal and the three solenoids of the selector SB. All the switches of the rows I, II, IV, V and VI and the arms 314 of the four multiple switches are connected through line 334 and its branches 335 to 342 to the negative terminal of the current source.

Considering now the arrangement of the characters of the type face cylinder according to Fig. 5 a selected Kana may be found in each and any one of the groups 0 to 5 which are controlled by contact bank A as hereinbefore described. All primary Kanas are arranged in the columns 0, whereas the Nigoris form two sections of the columns 1 of all the six groups. The Han-Nigoris, signs, numerals and English letters, however, occur only in column 9 of group 2. If it is further considered that the contacts of bank A correspond to the "groups" in Fig. 5 and similarly those of bank B to the "columns," those of bank C to the "sections" and those of bank D to the "rows," then each of the Kanas can be identified by a four digit number wherein the first digit is the number of the contact of bank A, the second digit the number of the contact of bank B, the third digit the number of the contact of bank C and the fourth digit the number of the contact of bank D, which contacts must be depressed to print the selected Kana. In view, however, of the fact that all the primary Kanas occur in each group the contact of bank A which had been depressed to print the preceding character may also be used for the printing of any selected Kana. In other words no contact of bank A need be operated, provided any one of the keys of the bank was previously depressed, whereas in bank B the 0 contact must be closed. In banks C and D the contacts according to the third and fourth digits are to be operated. The printing of a Kana is accomplished in the following manner:

Presuming, e. g. a Kana corresponding to that of the third key of the keyboard row II which is the key II 2 shall be printed, and that the precedingly printed character belonged to group 4, then the four digit number of the Kana would be 4012 as the switches of the row II are connected to the contact 1 of bank C and the third switches of all the rows, I, II, IV, V and VI are connected to contact 2 of bank D as shown in Fig. 13. Now in order to print the selected Kana first key K2 will be depressed whereby current will flow from — through line 339, switch K2', line 324, solenoid K2'', lines 333 and 332 to + whereby the solenoid will be energized and plunger p2 will establish connection between point 329' and line 331, unless that plunger is already in the illustrated position due to the fact that the precedingly printed character was also a primary Kana. In consequence, current can flow from — through lines 339, 334 and 336, switch II2, line 331, point 329', line 329, contact arm 317 of multiple switch B', solenoid 250 of contact 0 of bank B and line 332 to +. Simultaneously, current flows from switch II2 on the one hand through the corresponding line of bundle 322, a lower arm 320 of multiple switch C' to the solenoid of contact 1 of bank C and through line 332 to +, and on the other hand, through the corresponding line 321, a lower arm 320 of multiple switch D' to the solenoid of contact 2 of bank D and on to +. In consequence, the type face cylinder will be shifted axially so as to bring the nearest column 0 in registry with the printing hammer, and will cause the hammer to strike when the character of row 2 in section 1 of Fig. 5 is in the printing position.

In order to print one of the Nigoris, key K1 is to be depressed whereby solenoid K1'' will be energized via line 323. Contact will be established by plunger p1 between point 330' and line 331 and plunger p2 will be released. The contact so closed will connect the solenoid 250 of contact 1 of bank B through line 330 and arm 318 with result that the nearest column 1 of the Nigoris is shifted in registry with the hammer of the printing part of the teleprinter. If an English letter or a character of the same column is to be printed, key K3' will be depressed to energize solenoid K3'' via line 325. Plunger p3 will then connect line 328 which is a branch of line 325, to points 326' and 327'. Thereby contact 2 of bank A and contact 9 of bank B will be closed and column 9 of group 2 of Fig. 5 will be shifted into printing position. Operation of the printing hammer when the section and row of the selected character are in registry with the hammer is accomplished in all cases as explained with respect to the printing of a primary Kana.

Fig. 14 illustrates the circuits for printing the Chinese-Japanese characters with the aid of the keys of row III. The circuit diagram shows the switches III 0 to 9 operative by the keys of the board, and also the function switch K4'. Each of the switches except the last mentioned one comprises an arm 400 which cooperates with two contact points 401 and 402 simultaneously, whereas the arm 403 of switch K4' cooperates with only one contact point 404. All the contact points 402 are connected to a line 425 which ends at the one terminal of a relay R4. The contact points 401 are connected to contact points 405 which can cooperate with the upper arms of the multiple switches A', B', C' and D'. The arrangement is such that the points 401 of the switches III0 to III5 are connected to those points in multiple switch A' the contact arms 313 of which are connected to the equally numbered solenoids 250. For instance, point 401 of switch III2 is connected by one of the lines 406 to the contact point 405 which cooperates with arm 313 connected to the solenoid 250 of contact 2 of bank A. Similarly, the contact points 405 of multiple switch C' are connected to points 401 of switches III0 to III4, and all points 401 are connected through lines of the bundle 406 to the ten contact points 405 of both the multiple switches B' and D'. A line 407 with branches 408, 409 and 410 connects contact points 411 which are cooperative with the aforementioned arms 314, to a solenoid 450 the purpose of which will be described hereinafter. Whereas in the illustrated position all the lower contact arms of the four multiple switches, such as e. g. the arms 320 of multiple switch C', bear against their coordinate contact points 320', energization of one of the solenoids 309 to 312 will attract the coordinate armature member. For instance solenoid 311 of multiple switch C' when energized will attract the armature 307 whereby all the upper contact arms 313 will contact the coordinate contact points 405 whereas the lower points 320 will be disengaged from the points 320'. Also the arms 314 will engage the coordinate points 411. It will be noted that the solenoids 250 of all the banks A, B, C, D are shown in Fig. 13 directly connected to line 332. For sake of clearer illustration in Fig. 14 branch lines 412, 413, 414 and 415 are shown which connect the solenoids 250 to the positive terminal of the power source. Also connected to the branch lines 412 to 415 are the solenoids 309 to 312 respectively, of which solenoid 309 is further connected through line 416 to the armature 417 of relay R4. When this relay is deenergized the armature is pulled by a spring 418 off a contact point 419 which is connected to the negative terminal of the power source through lines 447, 420 and 334. A stepping switch in general denoted by 421 is provided which comprises a toothed wheel 422 which may be stepwise turned by a pawl 423 against the restraint of a spring 424. A detent 426 will hold wheel 422 in the adjusted position. The aforementioned solenoid 450 which is connected on the one hand to line 407 and on the other hand through a line 427 to line 332 operates the pawl 423. A contact arm 428 is rigidly secured to the wheel 422 and bears, in the illustrated position, against two points 429 and 430 whereby relay R4 is connected to line 332 via lines 431 and 432. When wheel 422 is turned in anti-clockwise direction it will make contact between three points 434, 435 and 436, the one after the other, and a conductive arm 433 which is connected through line 449 with the points 402 of all the switches III0–III9. When arm 428 is turned a step beyond the point 436 it will press with a projection 437 against an arm 438 and thereby connect a line 439 via line 420 to —. When this contact is established, a solenoid 440 between lines 439 and 441 will be energized to raise the detent 426 permitting the spring 424 to return wheel 422 to its initial position. The aforementioned contact points 434, 435 and 436 are connected to lines 442, 443 and 444 leading to the three solenoids 310, 311 and 312, respectively. Point 404 of the switch K4' is connected through a line 445 to a solenoid 446 of the aforementioned switch 197 shown in Fig. 11, which serves as a spacer to advance the printing tape and ribbon stepwise as switch 197 is operated.

As stated hereinbefore each Chinese-Japanese character is identified by a four digit number. In order to print a selected character, e. g. the character identified by number 0337, switches III0, III3, again III3 and III7 have to be actuated the one after the other. When for this purpose switch III0 will be closed, current will flow from — through line 334 over arm 400 of the switch through point 402 of the latter, line 425, relay R4, line 431, contact 429, arm 428, contact 430, lines 432 and 332 to +. Thereby the relay R4 will be energized to close contact between 417 and 419. In consequence, current can flow from — through lines 420 and 447, contact 419, armature 417 and line 416 to solenoid 309 of multiple switch A' and from there through lines 412 and 332 to +. Owing to the energization of solenoid 309 the armature 305 will be attracted to disengage the lower arm 315 from contact point 316 and to establish contacts between all the points 405 and 411 with the coordinate upper arms 313 and 314.

Current will now flow from — through the contact point 401 of switch III0, the connected line 406 to the point 405 and arm 313 associated with solenoid 250 of contact 0 in bank A. From there connection is established through lines 412 and 332 to +. In consequence, bank contact 0 will be closed to cause axial movement of the type face cylinder as explained with reference to Fig. 11. Simultaneously current can flow from — through lines 334, 340 to contact arm 314 of multiple switch A', point 411 and line 407 to solenoid 450 and from therethrough lines 427 and 332 to +. Solenoid 450 is slower in its effect than the other solenoids. When fully energized it will attract the pawl 423 to turn wheel 422 one step, thereby to establish connection between 433 and 434 by means of arm 428 which disconnects points 429 and 430. In consequence, relay R4 will be deenergized, armature 417 will drop from point 419, solenoid 309 will be deenergized with the result that armature 305 returns to the initial position of Fig. 14 disconnecting all upper contact arms 313 and 314 of multiple switch A' from the coordinate contact points 405 and 411. When then switch III3 corresponding to the second digit of the selected character number will be operated, solenoid 309 can no more be energized inasmuch as there is no connection between points 429 and 430 through arm 428 of the stepping switch 421. Current will flow from — through point 402 of switch III3, line 449, arc 433, arm 428, contact 434, line 442, solenoid 310 and lines 413 and 332 to +. Thereby armature 306 of multiple switch B' will be attracted by the energized solenoid 310. Simultaneously current will flow through point 401 of the switch, the associated line 406 to contact point 405 and the upper arm 313 connected to the solenoid of contact 3 of bank B. From there connection is established through lines 413 and line 332 to +. Owing thereto latch 56 will engage the bar 38 to stop the axial movement of the type face cylinder when column 3 of group 0 is in registry with the printing mechanism. Furthermore, the contact between point 111 and arm 314 of the multiple switch B' establishes the circuit through solenoid 450 in the same manner as described with respect to the multiple switch A', and arm 428 will be moved into its next position preparatory to establishing a circuit from — through line 449, arc 433, arm 428, contact 435, line 443, solenoid 311, and lines 414 and 332 to +. When now switch III3 is again operated in correspondence with the third digit of the selected character solenoid 311 will be energized and shift the armature 307. The solenoid of contact 3 in contact bank C will be energized in a similar manner to the second digit, and arm 428 will be turned another step to close the contact between arc 433 and point 436.

Upon depression of the key operating switch III7 according to the fourth digit the solenoid 312 and also the solenoid of contact 7 of bank D will be energized to cause the printing of the selected character as hereinbefore described. Contact between arm 314 and point 411 of multiple switch D' will cause arm 428 to move on so that its projection 437 will turn the arm 438 to establish connection between lines 420 and 439. Thereby relay 440 will be energized and attract the detent 426. Spring 424 will then turn wheel 422 with arm 428 back to the initial position. This completes the printing of the selected Chinese-Japanese character.

The various switches, relays and solenoid mentioned in the description of Figs. 13 and 14 are arranged in the rear of the key levers as clearly shown in Fig. 12 and are accommodated in the housing part 27 which also contains the wiring of the mentioned elements. The required connections between the printing part 10 and the key board part 11 are combined in the mentioned cable 12. These connections essentially comprise the wires between the multiple switches A', B', C' and D' and the coordinate contact banks A, B, C and D and furthermore, the wires between the printer and the solenoid for advancing the perforated tape.

Although the keys of the key board 24 are provided with finger cups as clearly shown in Fig. 12 and there is the possibility of operating the keys manually, one of the main objects of the present invention is a Japanese language teleprinter which can be operated with the aid of a tape perforated according to the standard six unit code used in Japanese communications. Permutation of six units each offering two possibilities allows for sixty-four different functions which means as many as there are keys on the key board according to the invention. A mechanism applicable for the mentioned purpose is illustrated in Figs. 15 and 16. Fig. 15 shows one of the key levers 500 all of which may be pivoted on shaft 501. The levers are preferably all of the same length, only the finger cups may be differently spaced from the shaft 501 as e. g. the cups 502 and 502'. The tail end 503 of the lever 500 is located underneath a switch which closes one circuit if the lever is one of the function keys, but has to close two contacts if the lever is one of the other keys. The illustrated lever may be for example the last one in row VI which operates the switch K3' as hereinbefore described. It will be noted that in Fig. 12 for sake of better illustration the key lever operated switches are shown turned 90° from their actual position. Each lever 500 is connected by three leaf springs 504 to an intermediate bar 505 located between the lever and a row of six permutation bars 506 to 511 which extend across all the key levers. Each permutation bar is provided with a slot 512 for each intermediate bar 505 which can engage in the coordinate slots 512 when all of them are in the horizontal positions like those of the bars 506, 509 and 511 in Fig. 15. Otherwise bar 505 rests on the circumference of one of the permutation bars the slots of which are in the vertical position, as e. g. bar 507. In the last mentioned event illustrated in Fig. 15, the switch VI0 is in the "off" position. If, however, the permutation bars 507, 508 and 510 will be turned ninety degrees in the clockwise direction in Fig. 15, the intermediate bar 505 can drop in the slots 512 so far that the lever tail 503 will operate the switch K3'. In order to actuate the switch manually, lever 500 can be depressed by the user's finger, even in the illustrated position, owing to the resiliency of the springs 504.

Fig. 16 illustrates a means for turning the bar 506 in response to the reading of the perforated tape 26 and, it will be understood that the bars 507 to 511 are provided with similar means. Bar 506 has a collar 513 with which it bears against a partition or other part structure 514 of the key board housing. The end 515 of the bar is provided with a steep pitch external thread 516 which engages in a nut 517 constituting the armature of a solenoid 518. The solenoid is lined with a thin brass bushing 519 in which the nut 517 can easily slide in axial direction, a key 520 engaging in an axial groove 521 prevents the nut from rotating. The nut 517 bears with its inner end against a washer 522 between which and the bottom of bushing 519 a coil spring 523 is inserted. If now solenoid 518 will be energized the armature nut 517 will be attracted against the restraint of the springs and shifted inward until the washer 522 is stopped by a shoulder 524 of the bushing 519 after a movement according to one quarter pitch of the thread 516, whereby the bar 506 will be turned ninety degrees. When the solenoid 518 will be deenergized spring 523 will return the nut 517 and bar 506 to their initial position. As stated hereinbefore bars 507 to 511 are provided with similar means as bar 506, so that elements such as 513 to 524 are present in connection with each of the bars. It is merely to be noted that for sake of greater space the solenoids 518 of the bars 506, 508 and 510 are located on the one side, and those of the bars 507, 509 and 511 on the other side of the key board 24.

The solenoids 518 will be energized through a reading device through which the perforated tape 26 passes. A few rows of perforations 530 are indicated in Fig. 12 where the top of the device is removed. The reading device located in the extension 25 shown in Fig. 4 has an upper housing portion 531 and a lower housing portion 532 both of insulating material. The latter is recessed on its top so as to form with the upper portion a slot 533 to receive therein the perforated tape 26. In the upper housing portion 531 six fixed contact pieces 534 are located in registry with the rows of perforations of the tape. All the pieces 534 are connected by a line 535 to a conveniently located, manually actuated switch 536 which in turn is connected to the one pole of the current source. In the lower housing portion 532, six elongated contact pieces 537 are movably arranged in bores in registry with the pieces 534 respectively, and each piece 537 is urged upwards by a spring 538 so that a piece 537 which can be projected through one of the holes of tape 26 will contact the coordinate fixed piece 534. In Fig. 16 the second, third and fifth piece 537 counting from the left side are shown in contacting position. Each of the lower pieces 537 is connected by a line 539 to one of the solenoids 518 from where a line 540 leads back to the other pole of the current source.

Thus it will be clear that with the aid of a tape 26 perforated according to a six unit code any selected keys of the key board 24 can be operated in any desired sequence so as to cause the printer part 10 to print, in characters of the Japanese or English languages, messages communicated by the perforated tape. It is of course also possible to connect to the lines 539 additional apparatus, such as a transmitter, to be operated by the reading device simultaneously with the key board 24.

Although I have illustrated and described only one form of my invention, many alterations and modifications will be apparent to those skilled in the art, which can be made without departure from the essence and spirit of my invention which for that reason shall not be limited but by the scope of the appended claims.

I claim:

1. In combinaation with a device for printing a large number of different characters of which a small number of specific kind is more frequently used than the other characters, a printing device, a cylinder axially movable and continuously rotatable relatively to said printing device, said cylinder including a face with types of all said characters arranged thereon in a plurality of groups of peripheral columns, a predetermined column of each group consisting of said more frequently used character types, all said predetermined columns being alike as to the arrangement of said character types therein and as to the locations of said predetermined columns in said groups respectively, a mechanism to cause the printing of any selected character, a key board including a function key and a set of keys as many as there are characters in any one of said predetermined columns, and a mechanism, a first part of said mechanism being under the control of said function key to cause shifting of said cylinder with said predetermined column of that group in registry with said printing device in which the precedingly printed character occurs, and a second part of said mechanism being under the control of said set of keys to cause printing of a selected character of said specific kind the coordinate key of which has been depressed after the depression of said function key.

2. A device as claimed in claim 1, further comprising a second set of ten keys in said key board and a second mechanism under the control of said second set of keys to cause printing of any selected character of said cylinder by four successive operations of keys of said second set, and a third mechanism including means to render said first mechanism inoperative when said second mechanism is in operation.

3. A Japanese language telegraph printer comprising in combination a printer device, a cylinder axially movable and continuously rotating relatively to said printing device, said cylinder including a face with a large number of types of characters of primary and secondary Kana and Kanji kind arranged in a plurality of groups of peripheral columns and identifiable each by a four digit number, a predetermined column of each group consisting of said primary Kana types, all said predetermined columns being alike as to the arrangement of said primary Kana types therein and as to the locations of said predetermined columns in said groups respectively, a key board including a first set of ten keys, a second set of keys as many as there are Kana types in any one of said predetermined column, and a function key, a mechanism in connection with said first set of keys and operable by four successive operations of keys of said first set to print any selected one of said characters in accordance with its identifying number, and a second mechanism in connection with said function key and said keys of said second set, a first part of said second mechanism being under the control of said function key to shift said cylinder with said predetermined column of that group in registry with said printing device in which the precedingly printed character occurs, and a second part under the control of said second set of keys to cause printing of a selected primary Kana the coordinate key of which has been depressed after the depression of said function key when the type of said selected Kana is in registry with said printing device.

4. In a Japanese language telegraph printer, the combination of a printing device, a cylinder axially movable and continuously rotatable relatively to said printing device, said cylinder including a face with a large number of types of characters in peripheral columns of a plurality of groups, a first predetermined column of each group containing all primary Kana types, a portion of a second predetermined column of each group containing all Nigoris, all said first predetermined columns and all said portions of said second predetermined columns being alike as to the arrangement of said types therein, and as to their locations in said groups respectively, and a third predetermined column in one of the groups containing the Han-Nigoris, the letters of an alphabet, symbols and numerals, the remainder of the types on said cylinder being of a Kanji kind, a key board including three function keys respectively, coordinate with said predetermined columns, and a set of keys associated each to one of said Kana characters occurring in said first predetermined column, as many of the keys of said set as there are Nigoris in said second predetermined column being also associated to said Nigoris respectively, and the keys of said set being further associated to the characters, respectively of said third column, a mechanism in connection with said function keys, a first and a second part of said mechanism being under the control of said first and second function keys respectively, to shift said cylinder with the first and second columns respectively, of that group in registry with said printing device, in which the precedingly printed character occurs, and a third part of said mechanism being under the control of said third function key to shift said cylinder with said third predetermined column in registry with said printing device, and a second mechanism connected to said set of keys to cause the printing of a selected character of said first, second or third column by depression of the associated key after the depression of the corresponding function key.

5. A device as claimed in claim 4 wherein each of said columns extends over half of the circumference of said cylinder, and wherein the arrangement of the characters in said first, second and third columns is repeated on the other half.

6. A device as claimed in claim 4 in which said keys which are also associated to said Nigoris are the keys associated to those primary Kanas of which said Nigoris constitute the secondary forms.

7. In a Japanese language telegraph printer comprising a printing device and a cylinder axially shiftable and continuously rotatable relatively to said printing device, the combination of a type face of said cylinder including a relatively small number of types of Kana characters and a large number of types of Kanji characters, each identifiable by a four digit number, said Kana characters being arranged in a predetermined column in each of a plurality of groups of peripheral columns, all said predetermined columns being alike as to the arrangement of said Kana types therein and as to the locations of said predetermined columns in said groups respectively, a key board including a first set of ten keys, a function key, a second set of keys as many as there are Kana characters in any one of said predetermined columns and coordinate with said characters respectively, a first mechanism connected to said first set of keys for printing any character upon four successive operations of keys of said set, a second mechanism including a first part responsive to an operation of said function key to shift said cylinder with said predetermined column of that group in registry with said printing device in which the precedingly printed character occurs, and a second part under the control of said second set of keys to cause printing of a selected Kana the coordinate key of which has been operated after the operation of said function key, and a means included in said first mechanism to render said second mechanism inoperative by an operation of said first mechanism.

8. A type face cylinder for a telegraph printer which cylinder is axially movable and rotatable in relation to a printing device and the type face of which includes the types of a large number of characters of different frequency of use in the character combinations of communications, and wherein said character types are arranged in a plurality of groups of peripheral columns, the types of the charatcers most frequently used constituting at east one predetermined column of each group, all said predetermined columns being alike as to the arrangement of the types therein and as to their locations within said groups respectively, and the remainder of character types being located substantially according to their frequency of use in other columns from the one end of said cylinder to the other end, thereby to reduce the required average axial movement of said cylinder in the printing of communications.

9. A type face cylinder for a Japanese language telegraph printer, which cylinder is axially movable and rotatable in relation to a printing device and the type face of which includes types of primary Kanas, Nigoris and Kanjis, said types being arranged in a plurality of groups of peripheral columns, said primary Kana types constituting a predetermined column of each group, said Nigoris types constituting part of another column of each group, all said first columns being alike and all said parts of said second columns being alike as to the arrangement of said types therein, and as to their locations in said groups respectively, and said Kanji types being located within the remainder of said columns substantially according to the frequency of their use from the one end of said cylinder to the other end.

10. A key board for a Japanese language telegraph printer of Kana and Kanji characters, comprising a first set of forty-eight keys coordinate with said Kana characters respectively, a second set of ten keys, and at least one function key, a mechanism responsive to the actuation of said function key and a key of said first set to cause said printer to print a selected Kana, a second mechanism responsive to four successive operations of keys of said second set to cause said printer to print any selected character, a means included in said second mechanism to render said first mechanism inoperative upon the operation of keys of said second set, six permutation bars in operative relationship to all said keys, and means to operate said bars in accordance with the perforations of a tape perforated according to the standard Japanese six unit telegraph code.

11. In a telegraph printer for Japanese language communications, including a cylinder axially shiftable and rotatable in relation to a printing device and having a face provided with peripheral columns of a plurality of groups of types of Kana and Kanji characters identifiable each by a four digit figure, said Kana types constituting a predetermined column of each group, all said predetermined columns being alike as to the arrangement of said Kana types therein and as to their locations in said groups respectively, a key board including a first set of ten switching keys, a function switching key, and a second set of switching keys coordinate with said Kana types, and a four digit selecting mechanism for printing any character of said cylinder in response to four successive operations of keys of said first set, said mechanism including four multiple switches, the first and the second one for controlling the axial shift and stopping of the axial shift respectively, of said cylinder, and the third and fourth one for causing printing of a character, said multiple switches having two positions, in the first one of which said second multiple switch is in series with said function key, and said third and fourth multiple switches are in series with said switching keys of said second set, and means to shift said multiple switches, one after the other, into their second positions in response to said four successive operations of keys of said first set.

12. In a Japanese language telegraph printer including a cylinder axially shiftable and continuously rotatable in relation to a printing device and having a face provided with peripheral columns of a plurality of groups of types of Kana and Kanji characters, said Kana types constituting a predetermined column of each group, all said predetermined columns being alike as to the arrangement of said Kana types therein and as to their locations in said groups respectively, a first means for shifting said cylinder axially, a second means for stopping the shifting of said cylinder with a column containing a selected character in registry with said printing device, and third and fourth means for operating the printing device when said selected character is in registry with said device, the combination with said means of a key board comprising a first set of ten keys, a mechanism connected to said four means and said keys for operating said means, one after the other, by four successive operations of keys of said set, a function key connected to said second means, and a second set of as many keys as there are Kana characters in one of said predetermined columns, said keys of said second set being connected to said third and fourth means whereby operation of said function key and one of said keys of said second set will cause the printing of a selected Kana from a type in that group in which the precedingly printed character occurs.

13. In a Japanese language telegraph printer including a rotatable and axially shiftable type face cylinder having its face divided in areas arranged in a plurality of groups of peripheral columns and a plurality of sections of axial rows, four multiple selector switches co-ordinate with said groups, columns, sections and rows, respectively, to operate a mechanism for bringing the column in which a selected one of said areas occurs in registry with a printing device and to cause printing when said area registers with said device, and a stepping switch for rendering said selector switches operative the one after the other, the combination of Kana types in a predetermined column of each group of said type face areas, said predetermined columns being alike as to the arrangement of said Kana types therein and their locations in said groups, a large number of Kanji types in other areas of said cylinder face, a keyboard comprising a first set of ten numerical keys, a second set of keys one for each Kana, and a function key, two contacts co-ordinate with each key of said sets for simultaneous closure upon actuation of said key, and one contact co-ordinate with said function key, a first line connection between one of said contacts of each of said numerical keys and said stepping switch, a second line connection between the second contact of said numerical key and a corresponding contact of each of said multiple switches, a third and a fourth line connection between the contacts respectively of each Kana key and corresponding contacts respectively of said third and said fourth multiple switches, and a fifth line connection between said function key contact and said second multiple switch.

14. A device as claimed in claim 13, further comprising alphabetic types provided in another predetermined column of one of said groups of cylinder face areas, as many key board keys of said second set as there are alphabetic types, being co-ordinate with said alphabetic types respectively, a second function key and two contacts co-ordinate with said second function key for simultaneous closure by said second function key, a sixth and a seventh line connection between said contacts respectively of said second function key and co-ordinate contacts respectively of said first and said second multiple switches to bring said other predetermined column in registry with said printing device.

References Cited in the file of this patent

UNITED STATES PATENTS

| | | |
|---|---|---|
| 1,606,126 | Houston | Nov. 9, 1926 |
| 2,125,616 | Laudano | Aug. 2, 1938 |
| 2,375,541 | Dirkes et al. | May 8, 1945 |
| 2,412,777 | Chung-Chin Kao | Dec. 17, 1946 |
| 2,427,214 | Chung-Chin Kao | Sept. 9, 1947 |
| 2,458,339 | Buhler et al. | Jan. 4, 1949 |
| 2,613,795 | Yutang | Oct. 14, 1952 |